United States Patent [19] [11] 4,331,040
Swasey [45] May 25, 1982

[54] ANTI-BACKLASH GEARING

[75] Inventor: Archie N. Swasey, Oxford, Conn.

[73] Assignee: USM Corporation, Farmington, Conn.

[21] Appl. No.: 141,954

[22] Filed: Apr. 21, 1980

[51] Int. Cl.³ .................. F16H 55/18; F16H 35/08
[52] U.S. Cl. .................................... 74/409; 74/403; 74/440
[58] Field of Search ................ 74/409, 410, 403, 440

[56] References Cited

U.S. PATENT DOCUMENTS

| | | | |
|---|---|---|---|
| 1,435,571 | 11/1922 | Wright | 74/440 |
| 2,397,126 | 3/1946 | Buhrendorf | 74/409 |
| 2,641,937 | 6/1953 | Erhardt, Jr. et al. | 74/409 |
| 3,037,396 | 6/1962 | Martin | 74/409 |
| 3,405,580 | 10/1968 | Hallden | 74/409 |
| 3,512,477 | 5/1970 | Nelson | 74/409 X |
| 3,545,296 | 12/1970 | Eggins | 74/409 |
| 3,636,789 | 1/1972 | Geiger | 74/409 |
| 3,793,899 | 2/1974 | Bourbonnaud | 74/409 |
| 3,803,936 | 4/1974 | Kraeper | 74/409 |
| 4,036,074 | 7/1977 | Bodnar | 74/409 |

Primary Examiner—C. J. Husar
Assistant Examiner—Conrad Berman
Attorney, Agent, or Firm—Vincent A. White

[57] ABSTRACT

A gear system adapted to eliminate backlash between a set of reversible gears. The gears are also arranged to perform without backlash when their center distances are changed. One gear of the double helical type fixed to a first shaft is in engagement with a single adjustably secured first helical gear on a second shaft. A biased helical gear is slidably arranged on the second shaft adjacent the first helical gear, forcing the teeth of the biased gear against corresponding teeth of the double helical gear, automatically removing any clearance between them thus eliminating any backlash therewith, which is desirable for gears driving matched rolls.

5 Claims, 2 Drawing Figures

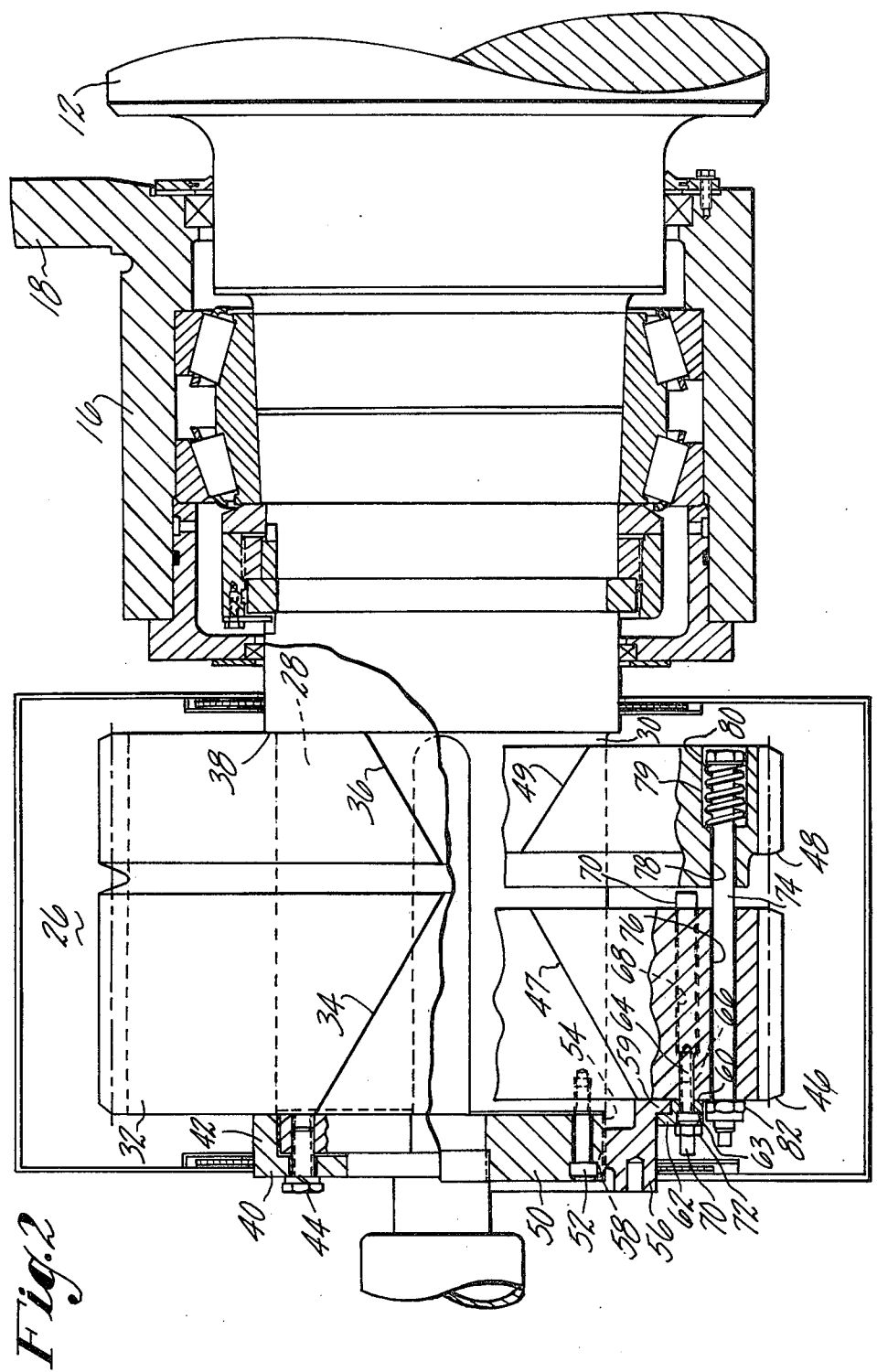

ANTI-BACKLASH GEARING

BACKGROUND OF THE INVENTION

(1) Field of the Invention

The present invention relates to gear systems, and more particularly to backlash eliminators in gear arrangements.

(2) Prior Art

Gear apparatus are used to drive rolls mounted for rotary motion in an embossing or engraving machine to emboss a web traveling between the rolls. The longitudinal and circumferential alignment of such rolls during the embossing process is of utmost importance. When the machine is in operation any circumferential motion between the rolls will sometimes result in a mutilated transfer of pattern to the material between the rolls. Changing gears is required on the roll assembly to remove backlash and maintain alignment when the gap between the rolls, and hence the center distance between gears, is varied even if only a fraction of an inch. Rotation or readjustment of the gears is required when the gear train is reversed.

Helical or herringbone gears are the best way to attempt circumferential alignment. These are shown in U.S. Pat. Nos. 3,512,477 to Nelson; 3,793,899 to Bourbonnaud; 3,803,936 to Kroeper; and 3,545,296 to Eggins. The alignment, that is, the reduction or elimination of backlash, is not always maintained, especially when the rolls and hence, the gears are separated to allow for various widths of webs traveling therebetween. As the gears become separated, the teeth become partially disengaged and meshing contact at the pitch line between the separate gears becomes impossible. When this occurs, backlash may be evidenced.

The patent to Geiger, U.S. Pat. No. 3,636,789 shows a gear drive utilized to move gun turrets, wherein the gear drive has a double pinion shaft which is axially displacable by means of a pressure medium to cause helical gears to pressurizably engage counter gears. The gear drive shown in the Geiger Patent operates only on fixed centers, and as such would not eliminate backlash operating on a set of rolls having a web traveling therebetween.

The patent to Eggins, U.S. Pat. No. 3,545,296 shows a variable gear tooth assembly having an arrangement of split pinions movable relative to one another to change the effective loading of a respective pinion as compensation for irregularities in a large gear. The gear tooth assembly is not adapted to variable centers between the axes of the two gear shafts, and it uses spacers or the like to keep the split pinions apart as opposed to letting the pinions react fully with its associated gear engaged therewith.

The patent to Wright, U.S. Pat. No. 1,435,571 shows a gearing arrangement wherein a pair of helical gears are axially displacable with respect to one another and are biased apart to cause circumferential displacement of their contiguous teeth to cause a diminished intertooth spacing, making the teeth of an engaging gear fill the intertooth space completely to reduce noise and wear. This gearing arrangement is used for single direction rotation only, and is not adaptable here for variable center distance systems.

Thus, it is an object of the present invention to provide a gear system which eliminates backlash for its gearing arrangement regardless of the direction of rotation of the gears.

It is a further object of the present invention to provide a gear system utilizable with a roll arrangement, to permit indexing therebetween.

It is yet a further object of the invention to provide a gear system which will eliminate backlash therewithin, while also permitting the distance between centers of axes of cooperating gears to be changed as necessary.

BRIEF SUMMARY OF THE INVENTION

The present invention provides a gear system usable with a pair of roll members which require close circumferential alignment and which require occasional displacable center distance adjustment. The gear system comprises a first and a second shaft, which may consist of the journal portions of the respective roll members, the first of which has disposed thereon, a double helical gear. The second shaft has a pair of split pinion gears keyed thereon. The outermost split pinion gear has an annular ring restraining it against axially directed movement away from the roll. The annular ring has an internal thread which is threadably engaged on an end plate which is bolted to the end of the second shaft. The innermost split pinion gear is biased toward the outermost pinion gear by a bolt and spring arrangement arranged therebetween. The outermost pinion is moved axially by rotating slightly the threaded annular ring. This axial movement of the outermost pinion causes its leading helix into contact with the driving helix on the corresponding portions of the double helical gear. The innermost pinion being connected to the outermost pinion by the adjustable spring loaded bolts moves (axially) with the outermost pinion. The springs push the innermost gear toward the outermost gear putting pressure on the backside of the helical teeth on the corresponding portions of the double helical gear on the first shaft, eliminating any clearance therebetween, and resulting in the elimination of backlash during gear system rotation. As the distance between centers or rotation of the shafts is changed, by any minute amounts which may be required, the innermost pinion is biased towards the outermost pinion, making up for any clearance generated therebetween during center distance change.

BRIEF DESCRIPTION OF THE DRAWINGS

The object and advantages of the invention will become more apparent when viewed in conjunction with the following drawings, in which:

FIG. 2 is a partial sectional view taken along the lines II-II shown in FIG. 1.

DESCRIPTION OF THE PREFERRED EMBODIMENTS

Figure 1:
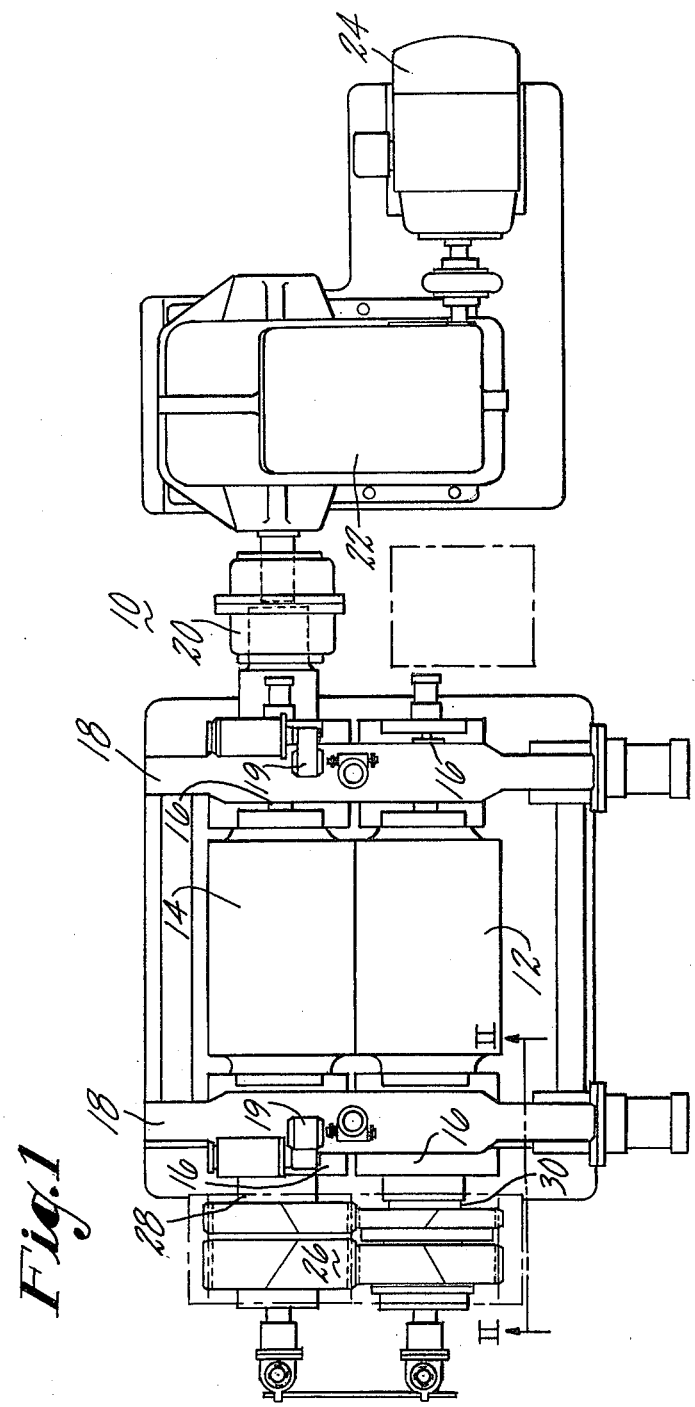
FIG. 1 is a plan view of a calendar roll assembly and connecting gearing.

Referring to the drawings in detail, and particularly to FIG. 1, there is shown a calendar roll assembly 10 having a front roll 12 and a drive roll 14 rotatively supported in a plurality of bearing arrangements 16 fixed in a frame 18. Each roll 12 and 14 are transversely movable from one another by a pair of motorized wedge units adapted therewith to effectuate center distance displacement therebetween. The drive roll 14 is connected through a linkage 20 to a transmission assembly 22. The transmission assembly 22 is rotatively driven by a drive motor 24 connected thereto. The front roll 12 and the drive roll 14 are rotatively interconnected by a gear system 26, shown more clearly in FIG. 2.

Each roll 12 and 14 has a journal portion 28 and 30 respectively, at each end thereof, on which it is rotatively supported. Each journal portion 28 and 30 extends through the bearing arrangements 16 and into the gear systems 26 to comprise shafts therefor. The gear system 26 comprises a double helical gear 32 fixedly arranged on the journal 28 of the drive roll 14 and is shown as the top half of the gear system 26 in FIG. 2. The double helical gear 32 has a first helix 34 or angled gear teeth which comprise its peripheral surface arranged on its longitudinally outermost portion, and a second helix 36, angled with respect to the first helix 34, on its longitudinally innermost portion. The double helical gear 32 is abutted against a shoulder 38 on the journal 28, and is secured against longitudinal movement away from the roll 14 by a gear locking plate 40 having an annular rim 42 pressed thereagainst. The gear locking plate 40 is bolted to the end of the journal 28 by an annular array of bolts 44, only one shown in FIG. 2. The gear system 26 as shown on its lower half in FIG. 2, also comprises a longitudinally outermost or first pinion gear 46 and a longitudinally innermost or second pinion gear 48, together called a split pinion gear, which are keyed onto the journal 30 of the front roll 12. The first and second pinion gears 46 and 48 each have a helical array of gear teeth 47 and 49, angled with respect to one another. The first and second pinion gears 46 and 48 are movable axially in a controlled manner as hereinafter defined.

An annular ring 50 having an outside diameter comparable to that of the journal 30 or shaft of the front roll 12, is secured by an array of bolts 52 to the end of the journal 30, only one bolt 52 being shown. The annular ring 50 has a threaded peripheral surface 54. An outer ring 56 having a threaded inner annular surface 58 is in adjustable threaded engagement with the annular ring 50. The outer ring 56 has an annular foot 59 which is in contact with the outer planar surface of the first pinion gear 46. A second clamp ring 60 is disposed about the outer ring 56 and has an annular lip 62, which peripherally overlaps the foot 59 of the outer ring 56. The second ring 60 has an array of countersunk bores 63 disposed therearound, only one shown, through which an array of bolts 64 extend into the first pinion gear 46. The second ring 60 also has a second array of bores 66 therethrough which extend coaxially through a threaded bore 68 in the first pinion gear 46. A threaded stud 70 having a nut 72 on its outer end, extends through each of the bores 66 in the second ring 60 and through the threaded bores 68 in the first pinion gear 46.

The second pinion gear 48, keyed to the journal 30, is connected to the first pinion gear 46, by an arrangement of adjustable tightenable bolts 74, only one shown, extending through axially aligned bores 76 and 78 in the first and second pinion gears 46 and 48 respectively, as shown in FIG. 2. Each bolt has a spring 80 disposed in a countersunk portion 79 of the bore 78 in the second pinion gear 48, between the head of the bolt 74 and the shoulder of the countersunk bore 78. The other end of the bolt 74 is received in a nut 82 which makes the bolt 74 captive between the first and second pinion gears 46 and 48. The second pinion gear 48, however, is free to slide axially slightly on the journal 30 with respect to the first pinion gear 46.

Aligning the rolls 12 and 14 circumferentially to insure that any engravings or embossings are opposite one another during operation of the calendar roll assembly 10 requires the turning of front roll 12 with respect to the drive roll 14. The outer ring 56 is rotatable for proper adjustment after loosening of certain bolts 64 or studs 70 releasing the clamp ring 60, with respect to the journal 30 and with respect to the first and second pinion gears 46 and 48 which are keyed thereto, which pinion gears 46 and 48 are slid axially so that the teeth 47 and 49 of the pinion gears 46 and 48 are forced against the mating helical teeth 34 and 36 of the double helical gear 32. The clamp ring 60 is then resecured between the first pinion gear 46 and the outer ring 56, and the studs 70 are replaced. The spring 80, after gear adjustment and reassembly, maintains forces on the second pinion gear 48 towards the first pinion gear 46, thus eliminating any clearance between its helical teeth 49 and those teeth 36 on the double helical gear 32. The elimination of the clearance eliminates any backlash. When the front roll 12 and the drive roll 14 are separated as necessary between their centers by fractions of an inch, the biased second pinion gear 48 is again forced toward the first pinion gear 46 to eliminate the clearance between the opposed helixes of the engaged gears. The threaded studs 70 may be withdrawn into the bores 68 in the first pinion gear 46 or extended therefrom a known distance to act as limiting devices on the amount of axial travel permitted in the second pinion gear 48 towards the first pinion gear 46.

The spring loaded, second pinion gear 48 may be alternatively biased by pressurizable means such as a hydraulic arrangement. The keying of both pinion gears 46 and 48 to the journal 30 permits both sections of the split pinion to act as driving gears wherein full power can be transmitted in either direction of rotation or through either the first pinion gear 46 or the second pinion gear 48, without loss of the anti-backlash feature.

Having thus described my invention, what I claim as new and desire to secure by Letters Patent of the United States is:

1. A gear drive mechanism for driving two shafts in synchronized rotation comprising:
   a unitary double gear having teeth of opposite helixes and being fixed on one of said shafts;
   two pinions slidable axially on the other of said shafts and fixed thereon against rotation;
   one of said pinions meshing with the teeth of said gear of one helix and the other of said pinions meshing with the teeth of said gear of the opposite helix;
   means for adjustably securing said one pinion to said other shaft for regulating the synchronized rotative relation between the shafts; and
   means for biasing said other pinion axially relative to said one pinion for controlling backlash between the teeth of the double gear and the pinions.

2. A gear drive mechanism according to claim 1 in which the pinion adjustably securing means includes an externally threaded member attached to the end of said other shaft and a ring mounted on said one pinion and threaded on said member so as to be axially adjustable by rotation of the ring.

3. A gear drive mechanism according to claim 1 in which the means for adjustably securing said one pinion to said other shaft comprises threaded means on said other shaft, having a ring threaded thereon, and means mounting the ring on said one pinion against axial movement but for rotation relative to said one pinion whereby rotation of said ring causes axial adjustment of said one pinion and variation of the angular relation between said shafts.

4. A gear drive mechanism according to claim 3 in which means are provided to fix said ring to said one pinion against rotation to fix the angular relation between said shafts.

5. A gear drive mechanism according to claim 3 in which said threaded ring is provided with an annular flange which is received within a recess of a clamp ring for mounting the ring for adjusting rotation on one side of said one pinion and for clamping said ring to said one pinion.

* * * * *